P. MEYER.
APPARATUS FOR GENERATING GAS FROM OIL.
APPLICATION FILED AUG. 13, 1907.
952,127.
Patented Mar. 15, 1910.
6 SHEETS—SHEET 1.
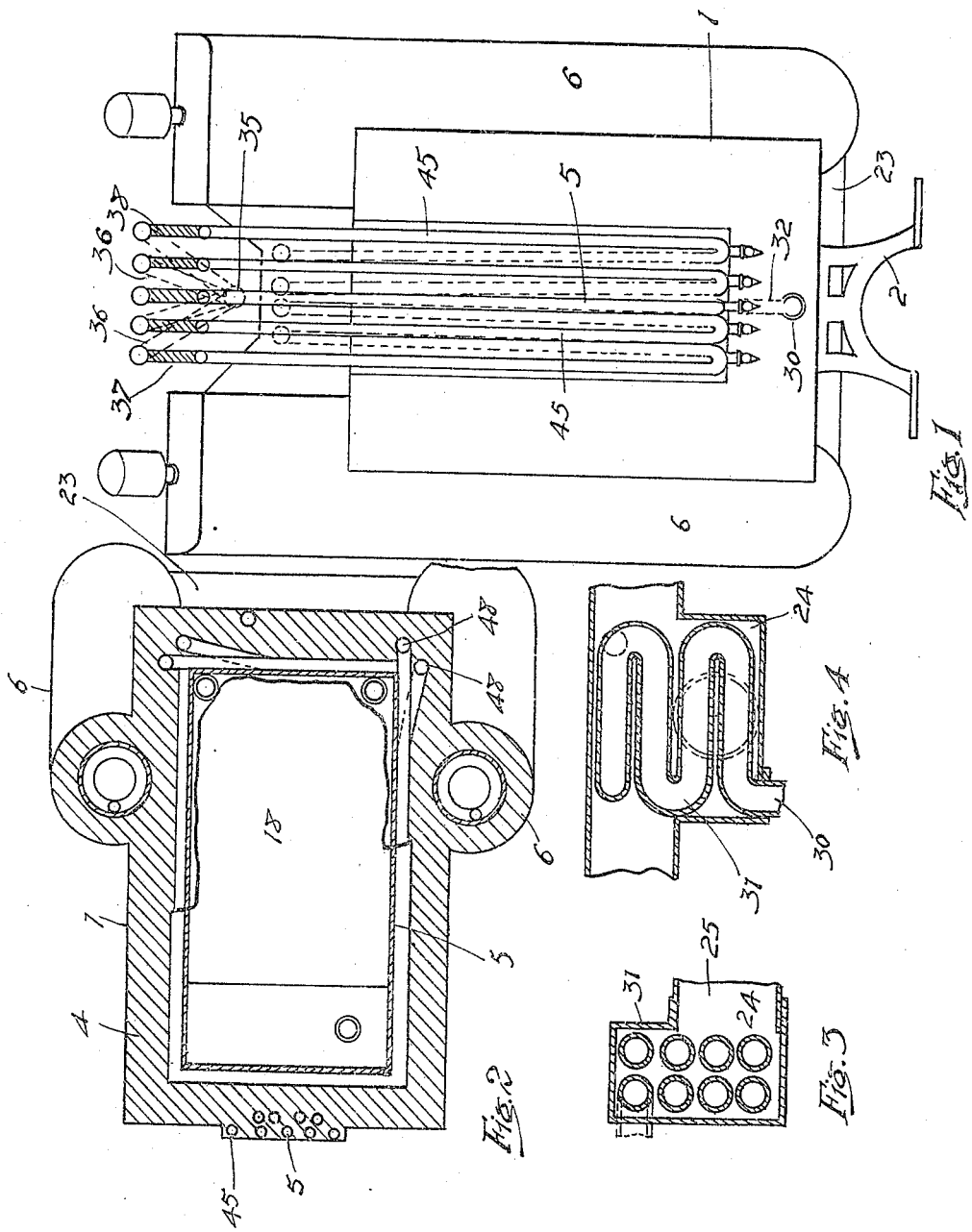
WITNESSES:
INVENTOR,
P. Meyer
BY
F. M. Wright,
ATTORNEY.

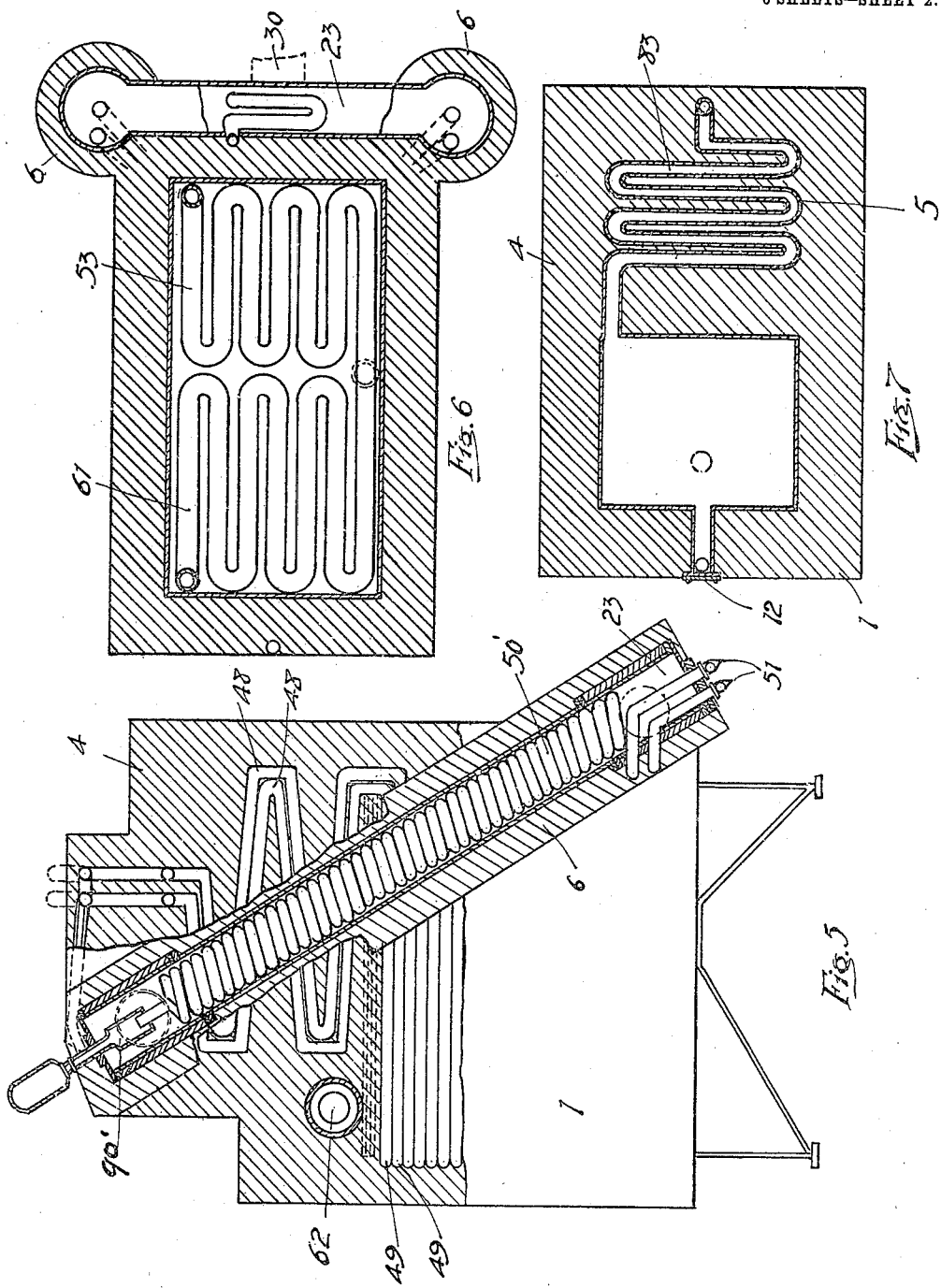

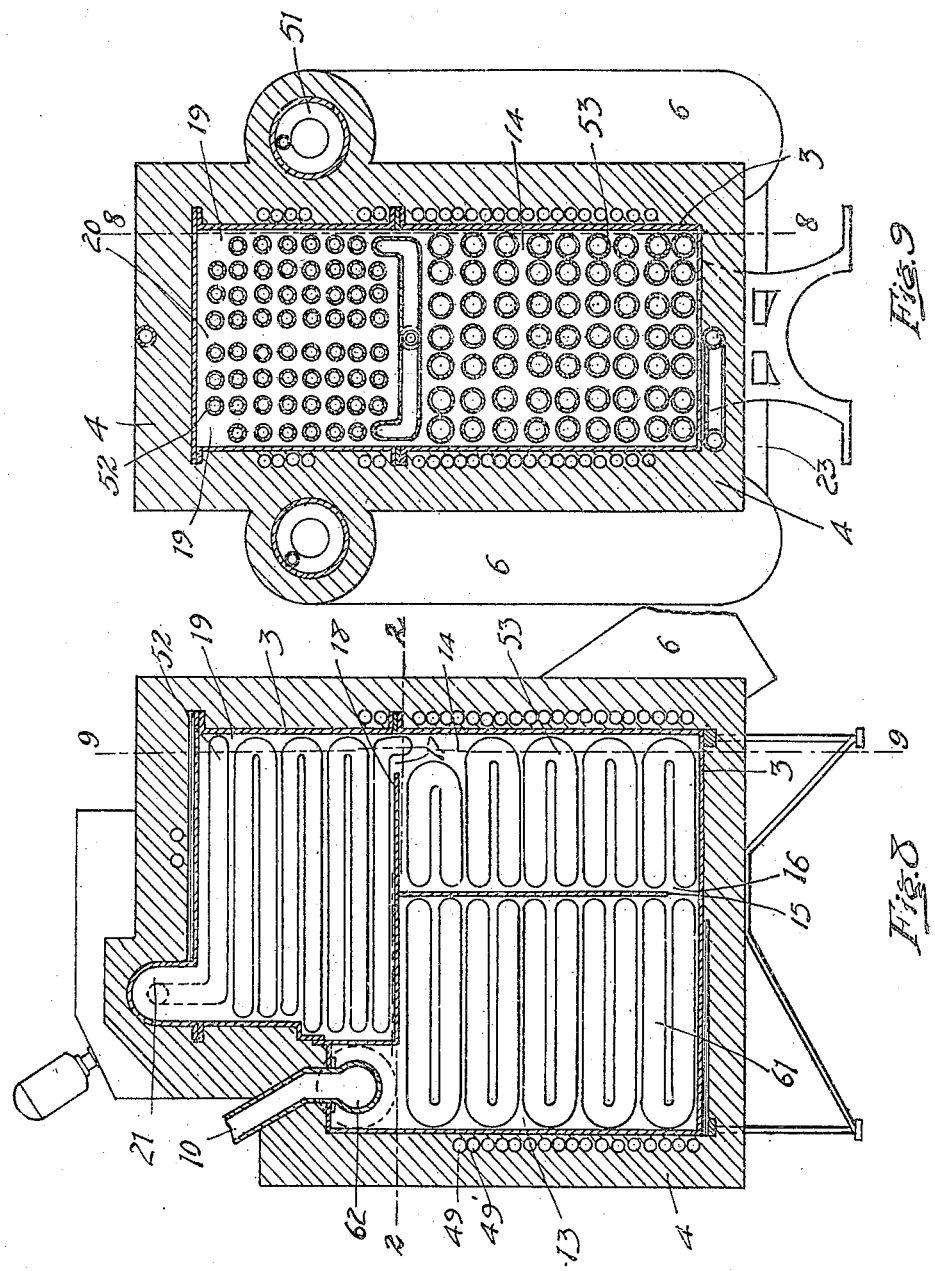

P. MEYER.
APPARATUS FOR GENERATING GAS FROM OIL.
APPLICATION FILED AUG. 13, 1907.
952,127.
Patented Mar. 15, 1910.
6 SHEETS—SHEET 4.
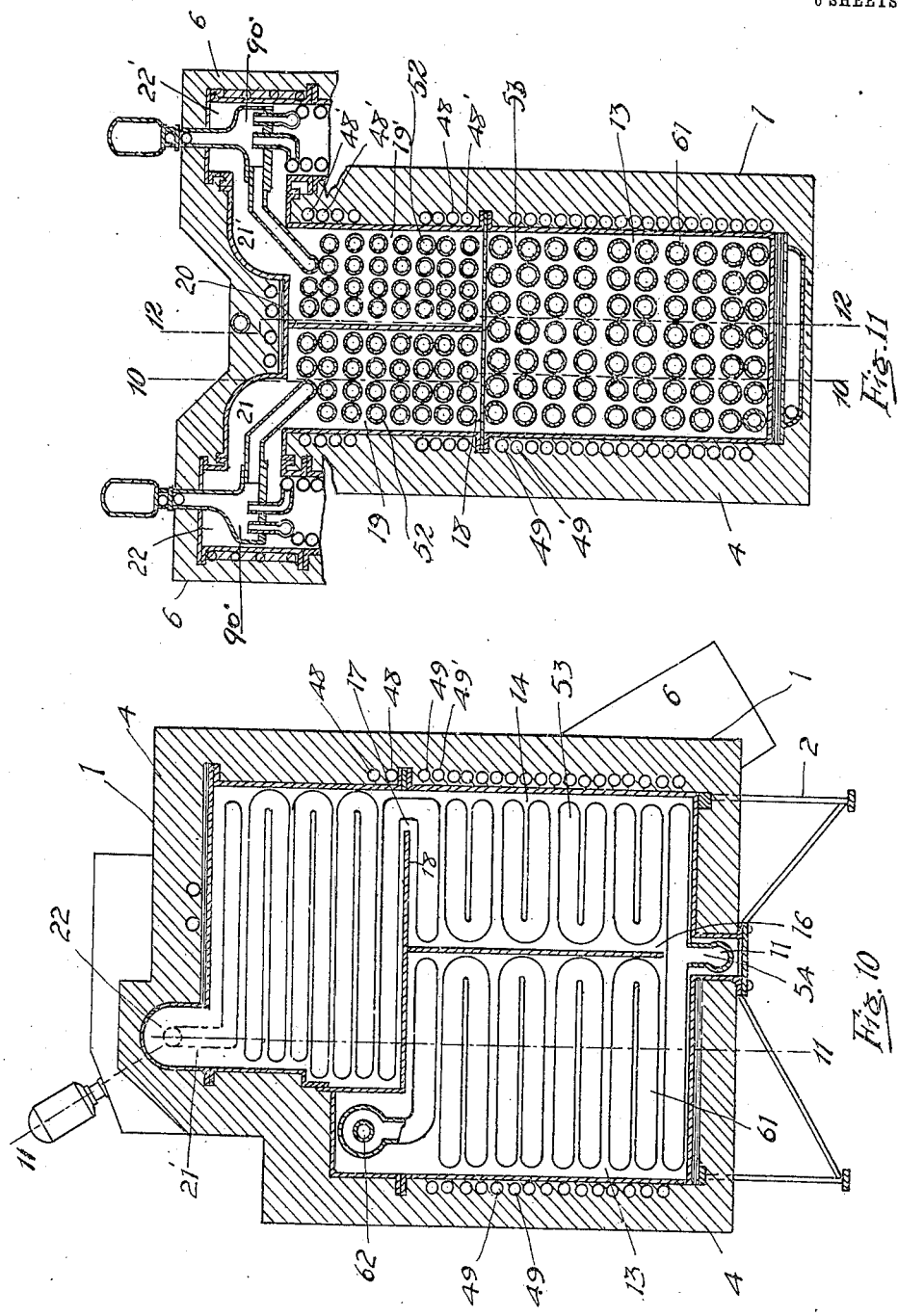

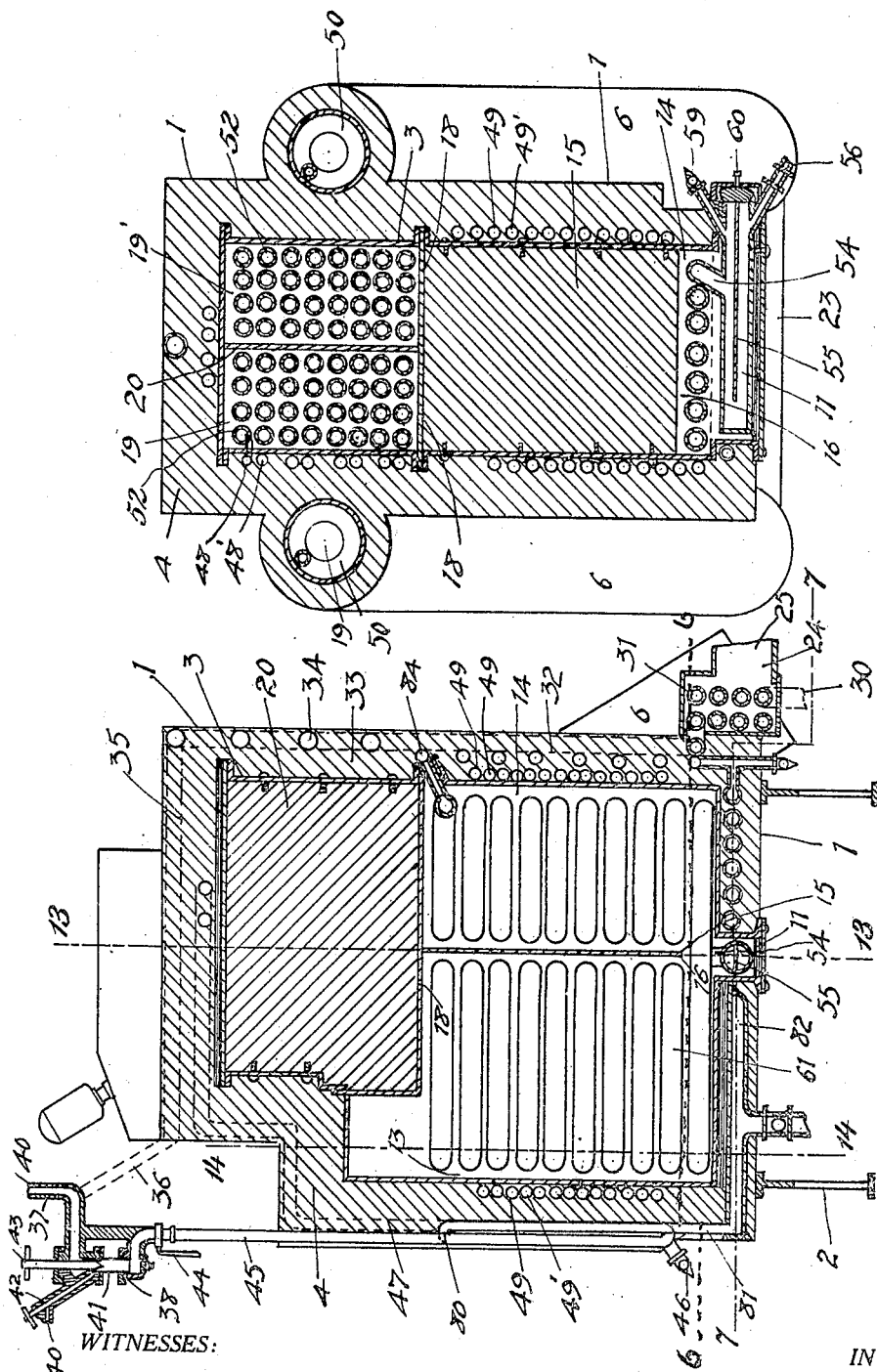

P. MEYER.
APPARATUS FOR GENERATING GAS FROM OIL.
APPLICATION FILED AUG. 13, 1907.
952,127.
Patented Mar. 15, 1910.
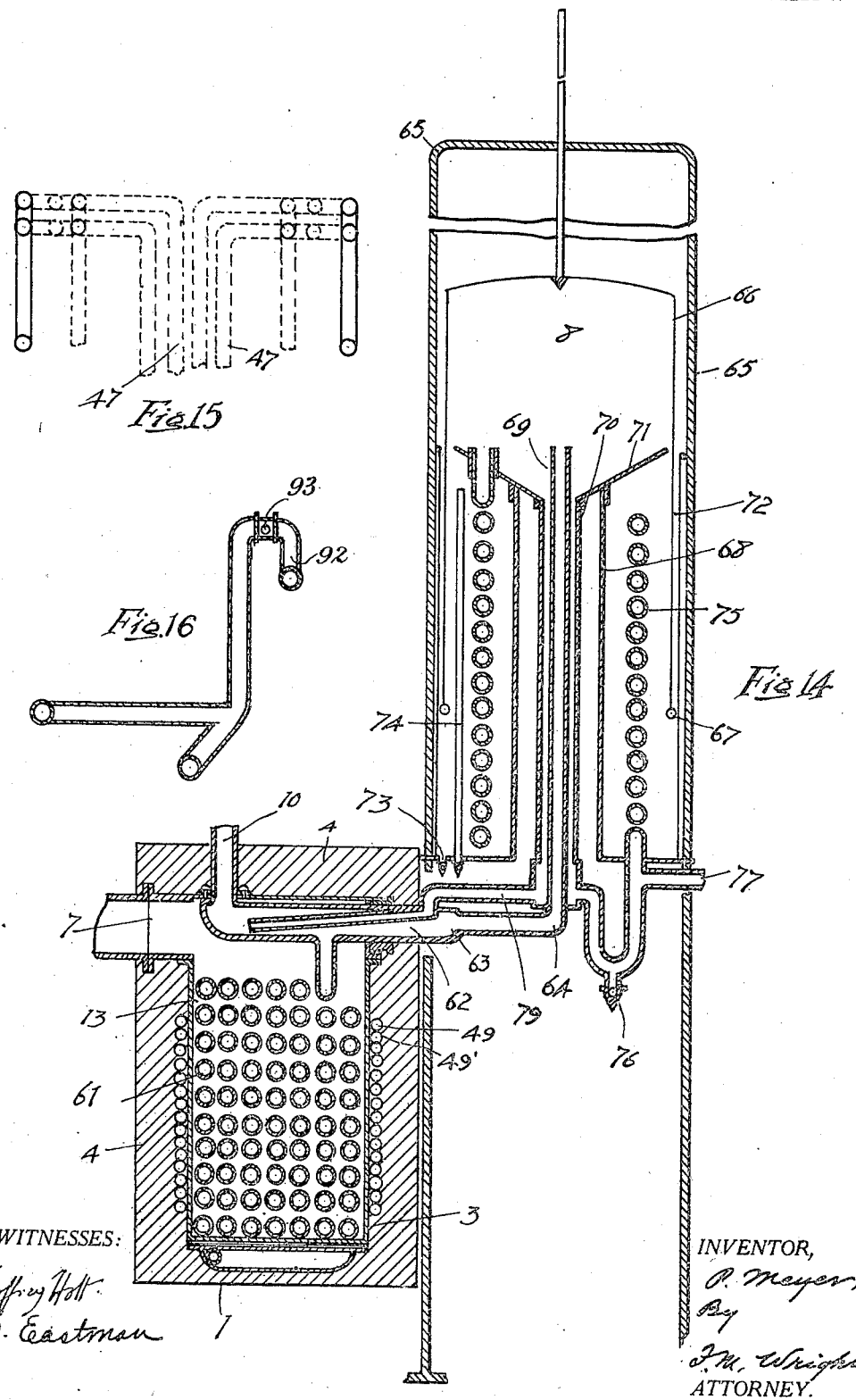

UNITED STATES PATENT OFFICE.

PHILIP MEYER, OF SANTA ROSA, CALIFORNIA.

APPARATUS FOR GENERATING GAS FROM OIL.

952,127.  Specification of Letters Patent.  Patented Mar. 15, 1910.

Application filed August 13, 1907. Serial No. 388,345.

*To all whom it may concern:*

Be it known that I, PHILIP MEYER, a citizen of the United States, residing at Santa Rosa, in the county of Sonoma and State of California, have invented new and useful Improvements in Apparatus for Generating Gas from Oil, of which the following is a specification.

The object of this invention is to provide an apparatus for generating oil gas, or water gas, from the exhaust heated gases of a gas engine, which will utilize said exhaust heat very economically.

In the accompanying drawing, Figure 1 is a front view of the gas generator, the gas holder being omitted; Fig. 2 is a horizontal section on the line 2—2 of Fig. 8; Fig. 3 is an enlarged vertical section of the preliminary heater; Fig. 4 is a vertical transverse section of the same; Fig. 5 is a side view, partly in vertical section, of the gas generator; Fig. 6 is a horizontal section on the line 6—6 of Fig. 12; Fig. 7 is a horizontal section on the line 7—7 of Fig. 12; Fig. 8 is a vertical longitudinal section on the line 8—8 of Fig. 9; Fig. 9 is a vertical transverse section on the line 9—9 of Fig. 8; Fig. 10 is a vertical longitudinal section on the line 10—10 of Fig. 11; Fig. 11 is a vertical transverse section on the line 11—11 of Fig. 10; Fig. 12 is a vertical longitudinal section on the line 12—12 of Fig. 11; Fig. 13 is a vertical transverse section on the line 13—13 of Fig. 12; Fig. 14 is a vertical transverse section on the line 14—14 of Fig. 12, showing also the gas holder; Fig. 15 is a detail plan view of oil pipes; Fig. 16 is a detail view of a trap pipe.

The main generator 1 is of a general rectangular form, being of somewhat less width than height. It is supported above the floor by the legs 2, or, for larger sizes, it may rest on concrete or the like foundation. The casing 3 of said generator is formed in sections which are secured together by flanges and screws, or in any convenient way, and in the smaller sizes may be of light cast iron, while for the larger sizes said iron may be used reinforced with T-bars, or angle bars, or other specially shaped iron bars. For very large sizes the casing may be built of refractory material such as fire brick. Around the casing 3, and inclosing all the heating pipes, is a thick layer 4 of heat retaining material such as magnesia or asbestos. Upon the two sides of said generator 1 are formed auxiliary generator sections 6, which extend obliquely downward, from the top of the generator at the front to the bottom thereof at the rear.

The waste gases from the gas engine, from which the heat is to be abstracted, enter at the left hand side by the front inlet 7, and on the right hand side at the front a gas holder 8 is attached to the generator. The oil from which the gas is to be generated, enters by a rear inlet 30 at the bottom of the generator and the gas generated therefrom escapes by a front outlet 10 at the top of the generator. In the bottom of the generator is a reservoir 11 for the asphalt obtained as a residue from the oil, when an oil is used having an asphaltic base. When water gas is to be formed, the water is supplied by a front inlet 12 at the bottom of the generator.

I will first describe the course taken by the waste gases from the gas engine, from which is derived the heat to generate gas from the oil, and will then describe the course taken by the oil in so abstracting said heat. In general these fluids flow in proximity to each other in opposite directions, so that the oil first comes into proximity with the gases when at their lowest temperature, before they escape into the atmosphere, and is heated gradually by flowing into proximity with waste gases of continuously increasing temperature. While the exhaust gases are compelled to travel in a tortuous path, the exhaust is by no means interfered with, because, first, the passages are large compared with the exhaust outlet of engine, and, second, the volume of the gases is reduced by their being cooled. Furthermore, the exhaust is without any noise, the exhaust gases being discharged almost cold.

The heat of the exhaust waste gases imparted to the chambers and the coils installed therein is so great that if, for instance, the engine discharged through the generator without taking its fuel from it, and so cooling said gases, the casing with its inside coils would soon become red hot.

The waste gases from the gas engine are received at the left of the generator by the inlet 7 the pipe connections being well covered with suitable heat retaining material, such as asbestos, so as to retain for the generator all the heat from said waste gases. These hot gases pass downward into a chamber 13 at the front lower portion of the generator, and separated from a rear chamber 14 by a vertical transverse partition 15. The gases then flow through a passage 16 beneath the lower edge of said partition 15 into said chamber 14 at the rear. They then flow upward and pass out from said chamber 14 (see Figs. 8, 10, 12,) through a passage 17 at the rear of a horizontal partition 18. From said passage 17 they flow upward into two chambers 19 and 19', which are divided from each other by a vertical longitudinal partition 20 (see Figs. 11, 12, and 13). The gases then flow obliquely forward and upward through said chambers 19 and 19' to outlets 21 and 21' at the upper front corners of the generator and thence into the upper ends of chambers 22 and 22', shown in Figs. 5, 9, 11 and 13, contained in the auxiliary sections and from the lower and rear ends of said chambers 22 and 22', the gases flow toward each other in a conduit 23 arranged at the bottom of the generator at the rear, meeting at the middle and connecting with the warming chamber 24, and flowing out by an outlet 25, the greater part of their heat having now been abstracted.

The direction of flow of the oil from which the gas is to be generated is, in general, opposite that of the waste gases. The inlet end of the oil pipe is shown at 30, in Fig. 4. Said pipe connects with a double zig-zag coil of pipe 31, shown in Figs. 3 and 4, and is at this point warmed by the exhaust gases which are now at a comparatively low temperature. From the coil 31 the oil pipe 32 extends upward to the upper portion of the generator, as shown in Fig. 12, being embedded in the insulating covering 33 of said casing, and is there connected with a zig-zag coil 34 which extends to the top of the generator, also embedded in said covering, and from said coil 34 a pipe 35 leads through said covering over the top of the generator to the front and connects with four branches 36, which connect respectively with four oil riser pipes 37, shown in Figs. 1 and 12. At the top of these pipes 37 are the visible feeders 38, one of which is shown in Fig. 12. Each visible feeder comprises, an outlet 40, a glass tube 41, a self-cleaning needle valve 42, an air vent 43 with a needle stop and a full stop cock 44. After passing through the visible feeders, the oil flows by the four feed and seal pipes 45 down in front of the generator on the outside thereof to the drain cocks 46 and then up again, as shown in Figs. 1 and 12. The purpose of this arrangement is to provide a closure or seal, so that, while the oil is being moved up and down in these seal pipes by the action of the evaporation of the oil, a blowing out, or leakage through, is prevented. This motion of the oil is also the reason why the vent 43 is convenient, as it permits of quickly removing any air-cushion or air trap by opening the stop. The riser portions 47 of these pipes are inclosed in the insulating covering, and extend to the top of the generator and over the casing, as shown in Figs. 10, 12, 13, and as indicated in detail in Fig. 15, and to the rear of the middle of the generator where they bend outward at right angles in pairs, and lead over the casing to the side of the generator, as shown in Figs. 8, 10, and 12, and in detail in Fig. 15. Said pipes now extend down the sides of the casing in pairs in zig-zag paths, as shown at 48, 48', Figs. 2, 5, 9, 11, and 13, to a point below the horizontal partition 18, and from this level they extend downward in coils 49, 49', passing entirely around the generator casing, as shown in Figs. 5, 8, 9, 10, 11, 12, 13, 14. At the bottom they again separate into pairs, one pair entering the lower end of each of the auxiliary diagonal chambers 19, 19', and are connected with helical coils 50, 50' in said chambers having at these points the valved drain pipes 51. By this time a considerable amount of heat has been absorbed by the oil, so that vapors have already been generated therefrom, and for this reason, there is provided on each side, a relief device consisting of a trap shaped pipe 92 and a valve 93 (Fig. 16) which device permits the vapors to rise without interfering with the downward flow of the oil in the pipes 48, 48', 49, 49'.

At the upper ends of the coils 50, 50', the oil has been practically vaporized, only the heavy liquids remaining unvaporized. The upper ends of said coils 50, 50', are connected, as shown in Figs. 5 and 11, with chambers 90 and 90', from which lead pipes 52 into the respective chambers 19, 19', said pipes being in zig-zag coils, occupying a considerable proportion of the space in chambers. In flowing downward through these coils, the oil and vapor become highly heated. The lower ends of said pipes 52 connect with a mixing coil of pipe 53 in the rear chamber 14 (see Figs. 8, 9, and 10), and here superheating begins. The lower end of said pipe 53 connects by a drop outlet 54 beneath the partition 15 with a retort or reservoir 11. The highly superheated vapors pass on while the unvaporizable liquids drop into the retort 11.

In treating oil of an asphaltum base, the residuum thus flowing into the retort 11 is asphaltum or pure maltha. If oil not having an asphaltum base were used, no deposit would here occur. This retort is divided by a horizontal partition 55 into upper and lower chambers, (see Figs. 12 and 13), communicating with each other behind the rear edge of the partition 55. It also has a valved drain-outlet 56, a test outlet 59, and a quickly removable clamp and dead flange outlet 60. By reason of the heat applied to this retort the heavier vapors are distilled off, and asphaltum is allowed to fill up the retort sufficiently to be able to draw off the pure maltha by the valve 56. The test cock 59 serves to determine when it is necessary to draw off the maltha. As a clogging in the exit might occur through carelessness, the clamp and the flanged opening are provided at 60, and since the partition 55 is removable, any obstruction can be quickly removed. The superheated vapors, now free from any liquids, rise in the superheated coil 61 in the chamber 13, and are there subjected to intense heat and then enter the retort 62, (see Fig. 14). This retort 62 is connected at one end with the outlet 10, which is adapted to be connected with a gas supply pipe for the gas engine, and the other outlet 63 is connected with a pipe 64 which leads to the gas holder 8. The latter comprises a fixed tank 65, a floating tank 66 with rollers 67, an inner wall 68, an inlet pipe 69, a surrounding pipe 70, a cone-shaped mouth 71, a water inlet and drain pipe 73, an oil drain pipe 74, a condenser coil 75 surrounded by water, having a self emptying drip connection provided with a drip cock 76, and a surplus gas outlet 77.

As the gas is produced, it passes either to the gas engine by the outlet 10, or to the gas holder 8. This gas holder should be kept under a pressure of, say, 1¼ or 1½ in. water gage, thus insuring a good supply of gas to the engine connected with the opposite end of the retort. The gas entering the gas holder becomes cooled, and is thereby partly condensed into the lighter oils. These are collected on the cone-shaped mouth 71, and run down in the space between the pipes 69 and 70, and are by the pipe 79 conveyed into the small retort 62, and are by means of said pipe dropped into the retort of the place where it is hottest, since the hot exhaust gases are discharged directly against the wall of the retort at the point where they drop. Said oils are thereby instantly converted into vapors, and are then instantly drawn out by the suction of the gas engine together with other gases from the generator. There is a certain amount of surplus gas produced, which may be drawn off through the condenser coil 75, in which its temperature is lowered, by the surrounding water, and all condensable matter removed; the liquid thus condensed is, by the self-emptying drip 76 conveyed to the retort 62 the same way as described before. The thoroughly cooled gases may be led by a pipe 77 to another gas holder of usual construction and the gas used as convenient and desired.

If the cooling of the gas engine is effected by the circulation of fresh water, continuously supplied from a suitable source, the hot water discharge pipe from the engine is conveyed above the visible water feed valves 38, Fig. 2, so as to hold a continuous column of this hot water about one foot high. Thus water in a very small quantity is admitted by the needle valve of the visible feeder 5, the water running down and up to the point 80, and thus also maintaining a seal on the generator. From here the water runs by a pipe 81 into the water evaporating chamber 82. The water then passes from said chamber 82 to the return bend coil 83, see Fig. 7, where it is converted into steam. The steam then rises by the return bend coil to the point 84 and in doing so becomes dry and superheated. At point 84 it enters into the mixer coil 53 from where, together with the oil vapors, it travels to the gas engine or holder. By this means water gases are produced.

I claim:—

1. In an apparatus of the character described, the combination of a main casing, a coil of pipe therein, means for admitting the exhaust gases of a gas engine to the interior of said casing and for causing said gases to flow in a tortuous path in said casing around said coil, an auxiliary casing on the outside of the main casing, means for causing said gases to flow from said main casing to, and through, said auxiliary casing, a warming chamber connected with the end of said auxiliary casing and arranged to permit the gases to flow from the latter casing through said warming chamber to the atmosphere, and means for conducting oil in proximity with the gases so flowing, comprising a pipe, leading first into the warming chamber, then into proximity with the main casing on the outside thereof, then into the interior of the auxiliary casing, and then connected with the pipe in the interior of the main casing, and heat insulating material surrounding said pipe on the outside of said casing, substantially as described.

2. In an apparatus of the character described, the combination of a casing, heat insulating material around said casing, a warming chamber, means for directing the waste gases from a gas engine through the interior of said main casing in a tortuous direction and then through the warming chamber, and an oil pipe leading first through said warming chamber, then in said heat insulating material, and then through the interior of said casing, substantially as described.

3. In an apparatus of the character described, the combination of a main casing, partitions therein dividing the same into chambers, means for conducting gases from a gas engine through said chambers in a tortuous path, an insulating covering around said casing, and a tortuous oil conduit, leading, first, to said insulating covering, and then, in succession, to the reverse chambers in the opposite order to the waste gases, substantially as described.

4. In an apparatus of the character described, the combination of a main casing, partitions dividing the same into chambers, an auxiliary casing on the outside of the main casing, insulating covering for said casings, means for supplying waste gases from a gas engine to said main casing, the partitions in the latter casing and the auxiliary casing being arranged to cause the waste gases to flow in a tortuous path, first, through said chambers and then through the auxiliary casing, and a tortuous oil conduit leading first, in the insulating covering of the main casing, then through the auxiliary casing, and then through the several chambers of the main casing, in the opposite direction to the waste gases, substantially as described.

5. In an apparatus of the character described, the combination of a main casing, partitions dividing the same into chambers, an auxiliary casing on the outside of the main casing, insulating covering for said casings, means for supplying waste gases from a gas engine to said main casing, the partitions in the latter casing and the auxiliary casing being arranged to cause the waste gases to flow in a tortuous path, first, through said chambers and then through the auxiliary casing, a visible feeder, and a tortuous oil conduit leading first, in the insulating covering of the main casing, then through said visible feeder, then through the auxiliary casing, and then through the several chambers of the main casing, in the opposite direction to the waste gases, substantially as described.

6. In an apparatus of the character described, the combination of a main casing, auxiliary casings, one on each side of the main casing, insulating coverings for said casings, partitions in the main casing dividing it into chambers, means for compelling waste gases from a gas engine to flow, first, through the several chambers of the main casing in a tortuous path, and then through the auxiliary casings, and an oil conduit comprising a tortuous pipe embedded in the insulating covering of the main casing, two pipes connected therewith, each in one of the auxiliary casings, and pipes in the several chambers of the main casing, connected with pipes in the auxiliary casing, the arrangement being such that the oil flows through said pipes in the opposite direction to the waste gases flowing around said pipes, substantially as described.

7. In an apparatus of the character described, the combination of a casing, means for causing waste gases from a gas engine to flow in a tortuous path through said casing, insulating covering for the casing, an oil pipe in said insulating covering, a pipe within the casing, and a riser pipe connecting the pipe in the insulating covering with the pipe in the casing, said riser pipe having branches extending downwardly and upwardly to form a seal, substantially as described.

8. In an apparatus of the character described, the combination of a casing, means for causing waste gases from a gas engine to flow in a tortuous path through said casing, insulating covering for the casing, an oil pipe in said insulating covering, a pipe within the casing, and a riser pipe connecting the pipe in the insulating covering with the pipe in the casing, said riser pipe having branches extending downwardly and upwardly to form a seal, and a visible feeder interposed between the top of the riser pipe and the pipe in the insulating covering, substantially as described.

9. In an apparatus of the character described, the combination of a casing, means for causing waste gases from a gas engine to flow in a tortuous path through said casing, insulating covering for the casing, an oil pipe in said insulating covering, a pipe within the casing, and a riser pipe connecting the pipe in the insulating covering with the pipe in the casing, said riser pipe having branches extending downwardly and upwardly to form a seal, a visible feeder interposed between the top of the riser pipe and the pipe in the insulating covering, and an air vent connected with said visible feeder, substantially as described.

10. In an apparatus of the character described, the combination of a casing, insulating material around said casing, means for compelling the waste gases from a gas engine to flow through said casing in a tortuous path, an oil conduit, comprising branches embedded in the insulating covering and an oil pipe within the casing, and inlets and outlets connected with said conduit, the parts being so arranged that the oil flows from said inlet to said branches and then through the pipe in the casing in the opposite direction to the waste gases, substantially as described.

11. In an apparatus of the character described, the combination of a main casing, auxiliary casings at the sides of the main casing, insulating coverings for said main and auxiliary casings, means for causing waste gases from a gas engine to flow in a tortuous path through said main casing and then through the auxiliary casings, and an oil conduit, comprising a part embedded in the insulating covering of the main casing, branches on opposite sides of the main casing also embedded in said covering, said branches being of tortuous form, coils, one in each of the auxiliary casing, and a coil of pipe in the main casing connected with both of said latter coils, the inlets and outlets of the waste gases and oil being such that said fluids flow in proximity to each other in opposite directions, substantially as described.

12. In an apparatus of the character described, the combination of a main casing, means for causing waste gases from a gas engine to flow through said casing in a tortuous path, a coil of pipe arranged in said casing to cause the oil to flow in proximity to said gases and in the opposite direction thereto, a retort in the bottom of the main casing, and a drop outlet from said pipe and connected with said retort, substantially as described.

13. In an apparatus of the character described, the combination of a main casing, means for causing waste gases from the gas engine to flow through said casing in a tortuous path, a coil of pipe arranged in said casing to cause the oil to flow in proximity to said gases and in the opposite direction thereto, a retort in the bottom of the main casing, a drop outlet from said pipe and connected with said retort, and a partition dividing said retort into upper and lower chambers connected with each other, substantially as described.

14. In an apparatus of the character described, the combination of a main casing, means for causing waste gases from the gas engine to flow through said casing in a tortuous path, a coil of pipe arranged in said casing to cause the oil to flow in proximity to said gases and in the opposite direction thereto, a retort in the bottom of the main casing, a drop outlet from said pipe and connected with said retort, and a removable partition dividing said retort into upper and lower chambers connected with each other, substantially as described.

15. In an apparatus of the character described, the combination with a main casing, a retort in the upper portion of said casing, one end of said retort being adapted to be connected with the supply pipe for a gas engine, a gas holder connected at the other end of said retort, an oil conduit connected at its discharge end with said retort, and means for causing the waste gases from a gas engine to be directed, first against said retort, and then to flow in proximity with said oil conduit in the opposite direction to the flow of the oil in said conduit, substantially as described.

16. In an apparatus of the character described, the combination with a main casing, a retort in the upper portion of said casing, one end of said retort being adapted to be connected with the supply pipe for a gas engine, a gas holder connected at the other end of said retort, a pipe leading from the gas holder for discharging the liquids condensed from the gases therein into said retort to be vaporized thereby, an oil conduit connected at its discharge end with said retort, and means for causing the waste gases from a gas engine to be directed first against said retort, and then to flow in proximity with said oil conduit in the opposite direction to the flow of the oil in said conduit, substantially as described.

17. In an apparatus of the character described, the combination with a main casing, a retort in the upper portion of said casing, one end of said retort being adapted to be connected with the supply pipe for a gas engine, a gas holder connected at the other end of said retort, a pipe leading from said gas holder to a distant point, an oil conduit connected at its discharge end with said retort, and means for causing the waste gases from a gas engine to be directed, first against said retort, and then to flow in proximity with said oil conduit in the opposite direction to the flow of the oil in said conduit, substantially as described.

18. In an apparatus of the character described, the combination of a main casing, a horizontal partition dividing the interior of the casing into chambers connected with each other, a retort in one of said chambers, coils of pipe in the respective chambers connected with each other, the retort being connected with one of said coils and the other coil being connected with an oil supply pipe, and means for discharging waste gases from a gas engine to be directed, first, against said retort, and then to flow through said chambers in the opposite direction to the flow of the oil in said pipes, substantially as described.

19. In an apparatus of the character described, the combination of a main casing, a horizontal partition dividing the interior of the casing into chambers connected with each other, a retort in one of said chambers, coils of pipe in the respective chambers connected with each other, the retort being connected with one of said coils and the other coil being connected with an oil supply pipe, means for admitting water at a suitable point in said oil supply pipe, and means for discharging waste gases from a gas engine to be, directed, first, against said retort, and then to flow through said chambers in the opposite direction to the flow of the oil in said pipes, substantially as described.

20. In an apparatus of the character described, the combination of a main casing, a horizontal partition dividing the interior of the casing into chambers connected with each other, a retort in one of said chambers, coils of pipe in the respective chambers connected with each other, the retort being connected with one of said coils and the other coil being connected with an oil supply pipe, a gas holder directly connected with said retort, and means for discharging waste gases from a gas engine to be directed, first, against said retort, and then to flow through said chambers in the opposite direction to the flow of the oil in said pipes, substantially as described.

22. In an apparatus of the character described, the combination of a main casing, a horizontal partition dividing the interior of the casing into chambers connected with each other, a retort in one of said chambers, coils of pipe in the respective chambers connected with each other, the retort being connected with one of said coils and the other coil being connected with an oil supply pipe, a gas holder directly connected with said retort, means for cooling the gas in said holder, a pipe conducting the liquids condensed therefrom to said retort to be again vaporized therein, and means for discharging waste gases from a gas engine to be directed, first, against said retort, and then to flow through said chambers in the opposite direction to the flow of the oil in said pipes, substantially as described.

22. In an apparatus of the character described, the combination of a casing, a horizontal partition dividing the interior of said casing into upper and lower portions connected with each other, a transverse vertical partition dividing the lower portion into front and rear chambers connected with each other beneath the bottom of said latter partition, a longitudinal vertical partition connecting the upper portion with two lateral chambers both connected with the rear lower chamber, means for causing the waste gases from a gas engine to pass, first through the front chamber, then through the rear lower chamber and then through the upper chambers, auxiliary generating chambers connected with the upper chambers, a common discharge gas conduit connected with said auxiliary chambers, and an oil conduit, passing, first through said discharge conduit, then in branches through said auxiliary casings and upper chambers, then by a common pipe through the lower rear chamber, and then through the lower front chamber, substantially as described.

23. In an apparatus of the character described, the combination of a casing, a horizontal partition dividing the interior of said casing into upper and lower portions connected with each other, a transverse vertical partition dividing the lower portion into front and rear chambers connected with each other beneath the bottom of said latter partition, a longitudinal vertical partition connecting the upper portion with two lateral chambers both connected with the rear lower chamber, means for causing the waste gases from a gas engine to pass, first, through the front lower chamber, then through the rear lower chamber, and then through the upper chambers, auxiliary generating chambers connected with the upper chambers, a common discharge gas conduit connected with said auxiliary chambers, an oil conduit, passing, first, through said discharge conduit, then in branches through said auxiliary casings and upper chambers, then by a common pipe through the lower rear chamber, and then through the lower front chamber, and a retort in said lower front chamber with which said oil pipe connects, substantially as described.

24. In an apparatus of the character described, the combination of a casing, a horizontal partition dividing the interior of said casing into upper and lower portions connected with each other, a transverse vertical partition dividing the lower portion into front and rear chambers connected with each other beneath the bottom of said latter partition, a longitudinal vertical partition connecting the upper portion with two lateral chambers both connected with the rear lower chamber, means for causing the waste gases from a gas engine to pass, first through the front lower chamber, then through the rear lower chamber and then through the upper chambers, auxiliary generating chambers connected with the upper chambers, a common discharge gas conduit connected with said auxiliary chambers, an oil conduit, passing, first through said discharge conduit, then in branches through said auxiliary casings and upper chambers, then by a common pipe through the lower rear chamber, and then through the lower front chamber, and a retort in said lower front chamber with which said oil pipe connects one end of said retort being adapted to be connected with the supply pipe for the gas engine, and a gas holder connected with the other end of said retort, substantially as described.

25. In an apparatus of the character described, the combination of a casing, an insulating covering therefor, means for causing waste gases from a gas engine to flow in a tortuous path through said casing, an oil conduit comprising a tortuous pipe in said insulating covering, trap-shaped riser pipes partly outside of said covering connected with said tortuous pipe, branches connected with the several riser pipes and embedded in said insulating covering, said branches extending to opposite sides of the main casing, and at said sides having a tortuous form, and means for conducting the oil and the vapors generated therefrom, from said latter pipes through said casing in the opposite direction to the waste gases, substantially as described.

26. In an apparatus of the character described, the combination of a casing, an insulating covering therefor, means for causing waste gases from a gas engine to flow in a tortuous path through said casing, an oil conduit comprising a tortuous pipe in said insulating covering, trap-shaped riser pipes partly outside of said covering connected with said tortuous pipe, branches connected with the several riser pipes and embedded in said insulating covering, said branches extending to opposite sides of the main casing, and at said sides having a tortuous form, means for conducting the oil and the vapors generated therefrom, from said latter pipes through said casing in the opposite direction to the waste gases, and means for supplying water and connecting the water and steam therein, in proximity to the waste gases to generate steam therefrom, substantially as described.

In testimony whereof I have hereunto set my hand in the presence of two subscribing witnesses.

PHILIP MEYER.

Witnesses:
STANLEY HOSMER,
JOHN RHOADES.